US010075416B2

(12) United States Patent
Yadav et al.

(10) Patent No.: US 10,075,416 B2
(45) Date of Patent: Sep. 11, 2018

(54) NETWORK SESSION DATA SHARING

(71) Applicant: Juniper Networks, Inc., Sunnyvale, CA (US)

(72) Inventors: Nagendra Singh Yadav, Bangalore (IN); Anil Kumar Reddy Sirigiri, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 154 days.

(21) Appl. No.: 14/983,982

(22) Filed: Dec. 30, 2015

(65) Prior Publication Data

US 2017/0195291 A1  Jul. 6, 2017

(51) Int. Cl.
*G06F 9/00* (2006.01)
*H04L 29/06* (2006.01)
(Continued)

(52) U.S. Cl.
CPC .......... *H04L 63/0245* (2013.01); *H04L 43/08* (2013.01); *H04L 61/1535* (2013.01);
(Continued)

(58) Field of Classification Search
CPC ........ G06F 21/30; G06F 21/60; G06F 21/554; G08G 1/0112; G08G 1/0116; G08G 1/0145; G08G 1/08
See application file for complete search history.

(56) References Cited

U.S. PATENT DOCUMENTS 5,598,535 A    1/1997  Brech et al.
5,690,452 A   11/1997  Baublits
(Continued)

FOREIGN PATENT DOCUMENTS

CN    101056306 A    10/2007
CN    101119321 A    2/2008
(Continued)

OTHER PUBLICATIONS

Marques N Sheth R Raszuk B Greene Juniper Networks J Mauch NTT America D McPherson Arbor Networks P: "Dissemination of flow specification rules; draft-ietf-idr-flow-spec-09. txt", Dissemination of Flow Specification Rules; draftietf-idr-flow-spec-09.txt, Internet Engineering Task Force, IETF; Standardworkingdraft, Internet Society (ISOC) 4, RUE DE.*
(Continued)

*Primary Examiner* — Abiy Getachew
(74) *Attorney, Agent, or Firm* — Shumaker & Sieffert, P.A.

(57) ABSTRACT

In general, techniques for sharing of network session data are described. The techniques may enable security devices to leverage application classification information in a federated manner. An example security device includes a memory and one or more processors. The processor(s) are configured to receive data representative of an application classification for a first packet flow from a second security device, to receive data of a second packet flow, and, when the second packet flow corresponds to the first packet flow, to monitor the data of the second packet flow based on the application classification for the first packet flow without determining an application classification for the second packet flow.

25 Claims, 7 Drawing Sheets

(51) Int. Cl.
  *H04L 12/26* (2006.01)
  *H04L 29/12* (2006.01)
  *H04L 29/08* (2006.01)

(52) U.S. Cl.
  CPC ...... *H04L 61/2007* (2013.01); *H04L 63/0236* (2013.01); *H04L 63/0263* (2013.01); *H04L 63/1416* (2013.01); *H04L 67/10* (2013.01); *H04L 67/104* (2013.01); *H04L 67/2842* (2013.01); *H04L 63/166* (2013.01)

(56) References Cited

U.S. PATENT DOCUMENTS

| | | | |
|---|---|---|---|
| 5,884,025 A | 3/1999 | Baehr et al. | |
| 5,960,458 A | 9/1999 | Kametani | |
| 6,147,976 A | 11/2000 | Shand et al. | |
| 6,438,723 B1 | 8/2002 | Kalliojarvi | |
| 6,697,381 B1 | 2/2004 | Talbot et al. | |
| 6,854,063 B1 | 2/2005 | Qu et al. | |
| 6,940,863 B2 | 9/2005 | Xue et al. | |
| 6,963,564 B1 | 11/2005 | Liu | |
| 6,973,055 B1 | 12/2005 | Du | |
| 7,272,646 B2 | 9/2007 | Cooper et al. | |
| 7,337,214 B2 | 2/2008 | Douglass et al. | |
| 7,383,438 B2 | 6/2008 | Fahrny et al. | |
| 7,454,792 B2 | 11/2008 | Cantrell et al. | |
| 7,463,590 B2 | 12/2008 | Mualem et al. | |
| 7,467,202 B2 | 12/2008 | Savchuk | |
| 7,496,962 B2 | 2/2009 | Roelker et al. | |
| 7,624,444 B2 | 11/2009 | Gupta et al. | |
| 7,725,558 B2 | 5/2010 | Dickenson | |
| 7,747,874 B2 | 6/2010 | Goodwill et al. | |
| 7,830,864 B2 | 11/2010 | Li | |
| 7,844,700 B2 | 11/2010 | Marinescu et al. | |
| 7,890,612 B2 | 2/2011 | Todd et al. | |
| 7,945,948 B2 | 5/2011 | Ueda et al. | |
| 7,950,059 B2 | 5/2011 | Aharon et al. | |
| 7,995,584 B2 | 8/2011 | Eswaran et al. | |
| 8,042,182 B2 | 10/2011 | Milani Comparetti et al. | |
| 8,112,800 B1 | 2/2012 | Yang et al. | |
| 8,166,554 B2 | 4/2012 | John | |
| 8,209,756 B1 | 6/2012 | Guruswamy et al. | |
| 8,228,926 B2 | 7/2012 | Miller et al. | |
| 8,291,495 B1 | 10/2012 | Burns et al. | |
| 8,397,284 B2 | 3/2013 | Kommareddy et al. | |
| 8,443,442 B2 | 5/2013 | Wang et al. | |
| 8,572,717 B2 | 10/2013 | Narayanaswamy | |
| 8,789,180 B1 | 7/2014 | Yang et al. | |
| 2002/0103953 A1 | 8/2002 | Das et al. | |
| 2002/0144156 A1 | 10/2002 | Copeland | |
| 2003/0088788 A1 | 5/2003 | Yang | |
| 2003/0105976 A1 | 6/2003 | Copeland | |
| 2003/0140140 A1 | 7/2003 | Lahtinen | |
| 2003/0149888 A1 | 8/2003 | Yadav | |
| 2003/0154399 A1 | 8/2003 | Zuk et al. | |
| 2004/0030927 A1* | 2/2004 | Zuk | H04L 63/02 713/160 |
| 2004/0151206 A1 | 8/2004 | Scholte | |
| 2004/0205360 A1 | 10/2004 | Norton et al. | |
| 2004/0243835 A1 | 12/2004 | Terzis et al. | |
| 2004/0268149 A1 | 12/2004 | Aaron | |
| 2005/0055399 A1 | 3/2005 | Savchuk | |
| 2005/0243789 A1 | 11/2005 | Dinello et al. | |
| 2005/0262560 A1 | 11/2005 | Gassoway | |
| 2006/0059551 A1 | 3/2006 | Borella | |
| 2006/0101511 A1 | 5/2006 | Faillenot et al. | |
| 2006/0114832 A1 | 6/2006 | Hamilton et al. | |
| 2006/0123479 A1 | 6/2006 | Kumar et al. | |
| 2006/0167915 A1 | 7/2006 | Furlong et al. | |
| 2006/0168273 A1 | 7/2006 | Michael | |
| 2006/0174337 A1 | 8/2006 | Bernoth | |
| 2006/0259950 A1 | 11/2006 | Mattsson | |
| 2006/0268932 A1 | 11/2006 | Singh et al. | |
| 2006/0288418 A1 | 12/2006 | Yang et al. | |
| 2007/0005801 A1 | 1/2007 | Kumar et al. | |
| 2007/0067445 A1 | 3/2007 | Vugenfirer et al. | |
| 2007/0171827 A1 | 7/2007 | Scott et al. | |
| 2007/0192847 A1 | 8/2007 | Yeom | |
| 2007/0192863 A1 | 8/2007 | Kapoor et al. | |
| 2007/0230445 A1 | 10/2007 | Barrie et al. | |
| 2008/0133518 A1 | 6/2008 | Kapoor et al. | |
| 2008/0172731 A1 | 7/2008 | Aaron | |
| 2008/0229415 A1 | 9/2008 | Kapoor | |
| 2009/0141729 A1 | 6/2009 | Fan | |
| 2010/0085975 A1 | 4/2010 | Wang et al. | |
| 2010/0095367 A1 | 4/2010 | Narayanaswamy | |
| 2013/0298220 A1* | 11/2013 | Yoon | H04L 63/0245 726/12 |
| 2017/0111320 A1 | 4/2017 | Bozga et al. | |

FOREIGN PATENT DOCUMENTS

| | | |
|---|---|---|
| EP | 1049294 A3 | 11/2000 |
| WO | 2015/145028 A1 | 10/2015 |

OTHER PUBLICATIONS

Moore et al., "Internet traffic Classification using bayesian analysis techniques," Jun. 2005, ACM DL, vol. 33, Issue 1, pp. 50-60.

Dreger et al., "Dynamic application-layer protocol analysis for network intrusion detection," Proceedings of the Usenix Security Symposium, Jul. 31, 2006 pp. 257-272.

U.S. Appl. No. 12/409,634, filed Mar. 24, 2009, entitled "Applying Fine-Grain Policy Action to Encapsulated Network Attacks," Yang.

Marques et al., "Dissemination of Flow Specification Rules—draft-ietf-idr-flow-spec-09," Internet-Draft, Internet Engineering Task Force, IETF, Internet Society (ISOC), May 26, 2009, 24 pp.

Extended Search Report from counterpart European Application No. 16204543.9, dated May 26, 2017, 8 pp.

Response to Extended Search Report dated May 26, 2017, from counterpart European Application No. 16204543.9, filed Jan. 5, 2018, 13 pp.

* cited by examiner

NETWORK SESSION DATA SHARING

TECHNICAL FIELD

This disclosure relates to computer networks and, more particularly, to security devices, such as next generation firewall (NGFW) systems used in computer networks.

BACKGROUND

A computer network typically includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the network to different security vulnerabilities.

In a typical network deployment, multiple next generation firewall (NGFW) devices may be deployed. Each NGFW device may process voluminous amounts of network traffic separately. Network traffic belongs to various applications running over different transport mediums (TCP/UDP/HTTP, and the like). The NGFW devices individually process the traffic and apply the dynamic application classification algorithms to classify applications. In various non-limiting example use cases, the NGFW devices may perform application classification with respect to peer-to-peer (P2P) applications. In general, NGFW network devices perform the application classification, store the data required for classification and does the policy enforcement separately. In many scenarios, P2P applications, such as BitTorrent®, eDonkey, Ares, Mute, Skype®, Gnuetella, Directconnect, and QVOD, are used for content delivery, downloading and sharing files, video files, audio files, and the like. In turn, such P2P applications tend to consume large amounts of network bandwidth. The algorithms used to classify such P2P applications by NGFW devices are complex and central processing unit (CPU) intensive, in that the algorithms may consume significant amounts of CPU clock cycles.

SUMMARY

In general, this disclosure describes techniques for mitigating the computing resource consumption and network bandwidth consumption caused by application classification. According to various aspects of this disclosure, security devices (such as NGFWs) may export the results of CPU-heavy application classification operations to other NGFWs in the network. In this way, the exported information can be re-used by other NGFWs without performing such application identification operations again for related traffic flows. According to aspects of this disclosure, these security devices (e.g., NGFWs) can be configured to coordinate with each other and exchange application classification information with each other. Examples of application classification information include application name, destination Internet protocol (IP) address and destination port. Apart from application classification information, the disclosed techniques may enable the NGFWs to share metadata and other attributes like exchanged peer information (peer-ip and peer port) required to classify future P2P sessions. The NGFWs may apply the exported classification information and other information to enforce policies for an application and take corresponding actions (e.g., allow/deny/drop) for the application, which may be a P2P application.

In one example, a method includes receiving, by a first security device, data representative of an application classification for a first packet flow from a second security device. The method may further include receiving, by the first security device, data of a second packet flow and, when the second packet flow corresponds to the first packet flow, monitoring, by the first security device, the data of the second packet flow based on the application classification for the first packet flow without determining an application classification for the second packet flow.

In another example, a first security device includes a memory configured to store network communications data, and one or more processors for processing at least a portion of the network communications data. The one or more processors may be configured to receive data representative of an application classification for a first packet flow from a second security device, to receive data of a second packet flow, and, when the second packet flow corresponds to the first packet flow, to monitor the data of the second packet flow based on the application classification for the first packet flow without determining an application classification for the second packet flow.

In another example, a non-transitory computer-readable storage medium is encoded with instructions that, when executed, cause one or more processors of a first security device to receive data representative of an application classification for a first packet flow from a second security device, to receive data of a second packet flow, and, when the second packet flow corresponds to the first packet flow, to monitor the data of the second packet flow based on the application classification for the first packet flow without determining an application classification for the second packet flow.

In another example, a system includes a first security device configured to send data representative of an application classification for a first packet flow to one or more security devices that are communicatively coupled to the first security device. The system may further include a second security device of the one or more security devices that are communicatively coupled to the first security device, the second security device being configured to receive the data representative of the application classification for the first packet flow from a first security device, to receive data of a second packet flow, and to monitor the data of the second packet flow based on the application classification for the first packet flow without determining an application classification for the second packet flow, when the second packet flow corresponds to the first packet flow.

In another example, a method includes determining, by a first security device, an application classification for a first packet flow, and communicating, by the first security device the application classification for the first packet flow and peer information for the first packet flow to a second security device that is communicatively coupled to the first security device.

The techniques described herein may provide several advantages. By exporting and syncing the classification and related P2P information (e.g., peer IP, peer port) between multiple device (e.g., NGFWs), the techniques of this disclosure may conserve the time, computing resources, and network bandwidth required to reclassify these applications on other devices. In this way, the techniques of this disclosure may improve network performance as well as individual device performance. Multiple NGFWs deployed in the network may work as coordinated devices, learn peer information, and dispatch information to other NGFWs.

The details of one or more examples are set forth in the accompanying drawings and the description below. Other features, objects, and advantages will be apparent from the description and drawings, and from the claims.

DETAILED DESCRIPTION

Figure 1A:
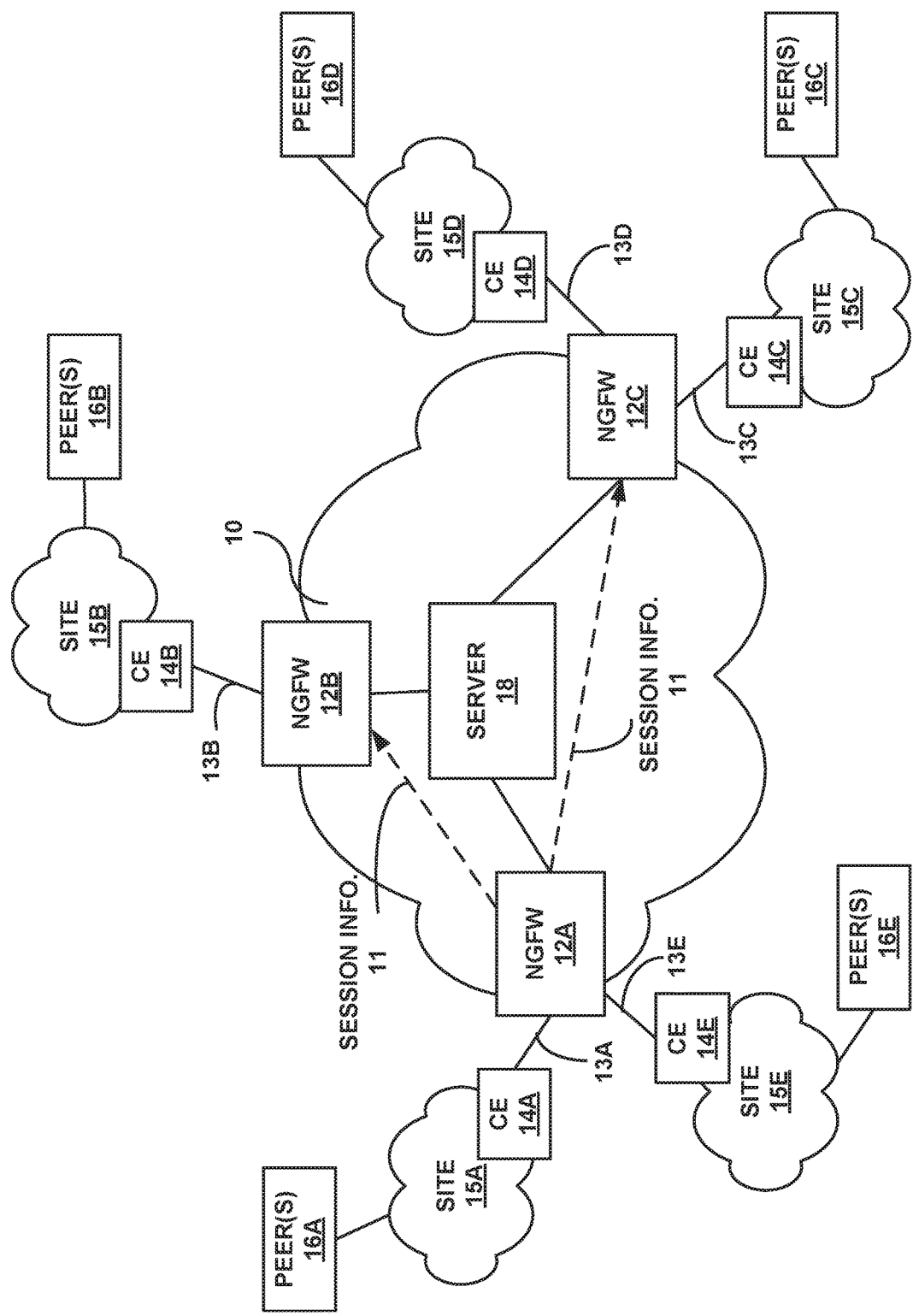
FIG. 1A is a block diagram illustrating an example computer network including next generation firewalls (NG-FWs) configured to receive and transmit data packets in a virtual private local area network service (VPLS) network.

FIG. 1A is a block diagram illustrating an example computer network including next generation firewall systems 12A-12C ("NGFWs 12") configured to receive and transmit data packets in a virtual private local area network service (VPLS) network 10 (hereinafter, "network 10"). Network 10, for example, may be an enterprise network, a campus network, a service provider network, a home network, or another autonomous system. Each of site networks 15A-15C ("site networks 15") may comprise one or more local area networks (LANs) connecting devices at a particular site, such as an enterprise or satellite location of an enterprise. In a VPLS instance, NGFWs 12 may provide a logical interconnect across network 10 such that customer edge (CE) devices 14A-14C ("CE devices 14") of site networks 15 included in the specific VPLS instance appear to be connected by a single LAN. In this way, remotely located peers 16 may securely share data via an emulated LAN over computer network 10, and using server 18. Each of peers 16 may represent one or more device that are operable to share data using various peer-to-peer ("P2P") applications, such as BitTorrent®, Skype®, and various others.

Site networks 15 may each comprise a plurality of customer or subscriber devices, such as desktop computers, laptops, workstations, wireless devices, network-ready appliances, file servers, print servers or other devices. In some cases, the remote sites may be configured to support multicast traffic, such as Internet Protocol Television (IPTV), desktop conferences, corporate broadcasts, music and video web casts, and other forms of multimedia content. For example, source 16 connected to site network 15A may comprise a source server of multicast traffic, and peers 16 connected to site networks 15B-15E may comprise subscriber devices of the multicast traffic.

CE devices 14 may be layer three (L3) routing devices for their respective network sites 15. In the illustrated example of FIG. 1, each of CE devices 14 is connected to a respective one of peers 16. If peer 18A, for example, is interested in receiving traffic of the multicast group, CE device 14A may send a control message in the VPLS toward source 16 requesting to join the multicast group.

NGFWs 12 may also operate as network switch devices and establish full mesh connectivity with other provider edge ("PE") devices associated with the specific VPLS instance. NGFWs 12 represent examples of security devices, in accordance with one or more aspects of this disclosure. As such, any one or more of NGFWs 12 may be referred to herein as a "security device." In some examples, any of NGFWs 12 may include a respective intrusion detection and prevention system (IDPS), or an IDPS may be enabled within any of NGFWs 12. In some cases, NGFWs 12 may be layer three (L3) routing devices configured to operate as layer two (L2) switching devices for the VPLS instance. NGFWs 12 are configured to forward traffic across computer network 10 between CE devices 14 include in the VPLS instance. According to the techniques of this disclosure, NGFWs 12 do not need to maintain or share any routing information. Instead, NGFWs 12 may inspect and selectively forward traffic for the VPLS instance based on information snooped from the PIM Hello messages and the PIM control messages sent between CE devices 14. In the example illustrated in FIG. 1, NGFWs 12 are connected to each of CE devices 14 via attachment circuit (AC) ports 13A-13E ("AC ports 13").

According to various packet flow inspection techniques, security devices, such as NGFW devices, may expend significant computing resources to perform application classification. Application classification (also referred to application identification) is generally performed in order to select appropriate signatures for intrusion detection and prevention purposes. For instance, application classification aids in detecting malicious activity from application-layer data. More specifically, different applications have different signatures, and therefore, the signature(s) applicable to the detected application for a session are applied to application-layer data of that particular session. In P2P scenarios, each individual NGFW may independently expend significant computing resources to perform application classification with respect a P2P packet flow (e.g., a packet flow between two of peers 16). Additionally, in some cases, P2P traffic, such as traffic over BitTorrent® sessions, is encrypted. In these scenarios, resources consumed by the NGFW s to perform application classification may be even greater than when the traffic is unencrypted, due to the additional complexity of processing encrypted data. To initialize state information for a P2P session, a NGFW may forward portions of a decapsulated session request to a P2P server, such as server 18. In turn, the P2P server (server 18 in this example) uses the received information to determine which peer devices are capable of fulfilling the needs specified in the P2P session request. For instance, the P2P server (e.g., server 18) may iterate through a log, or may ping each of the peers (other than the peer device that originated the session request) to determine which of the peers has sharable data to satisfy the requirements of the P2P session request.

Techniques of this disclosure are generally directed to sharing session data across devices, such as NGFWs 12, that can interpret pre-processed session data communicated in a common format. By sharing the session data across devices that can interpret commonly formatted data, the techniques enable the devices, such as NGFWs 12, to leverage application classification information previously generated by one another. As such, the techniques enable correlation of P2P session-administrating devices, thereby enabling the devices to connect with, export session data to, and collect session data from one another. Each P2P session has a unique set of information, and the techniques of this disclosure enable the devices to reuse the session-unique information to avoid redundant processing and reduce bandwidth consumption.

According to some implementations, the techniques described herein enable NGFWs 12 to share application classification information and peer information regarding specific P2P flows, thereby mitigating the amount of computing resources expended to perform application classification for the same P2P flow and/or a corresponding P2P flow in an opposite direction. According to implementations of the disclosed techniques, one or more NGFWs 12 may share existing P2P application classification information and peer information with one another. More specifically, one or more of NGFWs 12 that have performed application classification with respect to particular P2P flows may make the application classification information available to the remaining NGFWs 12. For instance, NGFW 12A may perform application classification with respect to a particular P2P flow to obtain an application classification portion of session information 11A. Additionally, NGFW 12A may correlate the application classification information with peer information of the P2P session, to form session information 11A. By implementing one or more techniques of this disclosure, NGFW 12A shares session information 11A (which includes application classification information and corresponding peer information) with one or more other NGFWs 12, such as NGFW 12B.

According to various implementations of the techniques described herein, NGFW 12A is configured to export just enough information via session information 11A to enable the rest of NGFWs 12 to service a P2P session, without duplicating the processing that NGFW 12A has already performed with respect to the P2P session. As an example, NGFW 12A is configured to generate session information 11A to include application classification information for the P2P session, and the corresponding peer information for the P2P session. NGFW 12A may cache peer information that includes a 2-tuple (alternatively, "double," "ordered pair" or "couple") of a peer IP address and a peer port as part of the cached session information. In this example, NGFW 12A also caches application classification information as part of the cached session information for the P2P session. For instance, NGFW 12A may cache application classification information that includes the 6-tuple (or "hexuple") of a destination IP address, a destination port, an application protocol, an application name, and an application classification path pertaining to the session.

Additionally, NGFWs 12 may exchange a peer information 2-tuple (hereinafter, "tuple") to identify a particular packet flow, as well as data representing an application classification for the packet flow. Thus, IDSP 12A, for example, may send a peer information tuple, along with an application classification, to NGFW 12B, that represents a classification of an application associated with the packet flow identified by the peer information tuple. The peer information is represented by layer-3 (L3) network data, while the application classification information is represented by layer-7 (L7) network data. While described herein with respect to the peer information tuple and application classification information, it will be appreciated that NGFWs 12 can, in other examples, implement various techniques of this disclosure to identify the packet flow using the five-tuple {source IP address, destination IP address, source port, destination port, protocol} and to also provide an application classification corresponding to the five-tuple as well.

In accordance with one or more aspects of this disclosure, NGFW 12A converts the cached session information to a format that can be readily processed and interpreted by the remaining NGFWs 12. For instance, NGFW 12A may convert the cached session information to the Internet Protocol Flow Information Export ("IPFIX") format to form session information 11A. In this example, NGFW 12A exports session information 11A in the IPFIX format to the remaining NGFWs 12. While session information 11A is shown in FIG. 1A as being transmitted to NGFW 12B and NGFW 12C, it will be appreciated that NGFW 12A may export session information 11A to any number of devices, either directly, or indirectly through one or more intermediary devices. However, it will be appreciated that, according to the techniques described herein, that NGFW 12A may export session information 11A to more than one of the remaining NGFWs 12. For instance, each of NGFWs 12 may relay received portions of session information 11, in cases where the originating NGFW 12 is not directly connected to any other device of NGFWs 12.

Any of NGFWs 12 that receives session information 11 shared by another NGFW 12 may implement aspects of this disclosure to leverage the received session information 11 in initializing state information for monitoring future P2P sessions between peers 16. For example, NGFW 12B leverages session information 11A received from NGFW 12A to initialize the state information for future P2P sessions that share common peer information parameter values with the P2P session from which session information 11A originated. Additionally, in this example, NGFW 12B can circumvent the process of application classification, by reusing the application classification of session information 11 for any packet flow for which the peer information matches the peer information of session information 11. In the example described above, NGFW 12B receives session information 11 in the IPFIX format. According to this example, NGFW 12B processes and stores the peer information and application classification information of session information 11.

NGFW 12B implements the techniques of this disclosure to compare the peer information tuples of future packet flows of the same P2P session against the stored information extracted from session information 11, to determine whether or not to perform application classification with respect to the received packet flow. More specifically, if the peer information tuple matches the peer information tuple of session information 11, or represents a return packet flow, then NGFW 12B reuses the application classification information without performing the potentially CPU-heavy process of application classification. In this way, techniques of this disclosure enable NGFWs 12 to maintain accurate P2P servicing while conserving computing resources.

In one example, NGFW 12B may receive a P2P packet flow from peer 16B. Applying one or more techniques of this disclosure, NGFW 12B may compare features of the received packet flow to the session data that was extracted from session information 11A and cached locally. In this example, NGFW 12B compares a peer information tuple of the received P2P packet flow with the corresponding fields in the cached session data. If the peer information tuple matches the cached data extracted from session information 11, then NGFW 12B may skip application classification in setting up state information for monitoring the new packet flow of the P2P session. Additionally, if the peer information tuple matches the cached data extracted from session information 11A, then NGFW 12B may configure state data for the new packet flow of the P2P session without forwarding the request to server 18. More specifically, if the peer information matches the peer information reflected in the cached session data, the matching data may circumvent the need for NGFW 12B to request peer information from server 18. Instead, NGFW 12B may implement the techniques disclosed herein to leverage the P2P session configuration already performed by NGFW 12A and shared via session information 11A.

The techniques described herein provide several potential advantages over known P2P session initialization and application classification techniques. In the example described above, NGFW 12A enables the remaining NGFWs 12 to draw on application identification or classification information that NGFW 12A forms from session data that NGFW 12A already processed. Thus, if NGFW 12A has already performed the potentially CPU-heavy process of decapsulating and decrypting data to form application classification information, then NGFW 12A may enable one or more of the other NGFWs 12 to avoid duplication of the application classification processing. Additionally, NGFW 12A may limit the exported session information to include just enough data for the remaining NGFWs 12 to circumvent application classification and peer information acquisition operations. In this way, the techniques of this disclosure enable NGFW 12A to share session information with the remaining NGFWs 12 while conserving computing resources by only converting the minimum required amount of data to the IPFIX format. The techniques also enable NGFW 12A to share session information 11A while conserving network bandwidth, because NGFW 12A generates session information 11A using only the minimum required amount of data to enable the remaining NGFWs 12 to circumvent the application classification and peer information acquisition operations that would otherwise be performed under known P2P techniques.

Similarly, the techniques of this disclosure provide several potential advantages at receiving NGFW s, as well. In the example described above, NGFW 12B leverages session information 11A to circumvent application classification and peer information acquisition operations, while still servicing the P2P session request received from peer 16B. In this way, the techniques of this disclosure enable NGFW 12B to conserve computing resources that NGFW 12B would otherwise expend to perform application classification with respect to the P2P session request and for packet flows in the P2P session. More specifically, NGFW 12B compares the peer information tuple and the application classification information of the P2P request received from peer 16 to the cached session data extracted from session information 11A, and if all of the compared data match, reuses the application classification data extracted from session information 11A in setting up the P2P session. Thus, NGFW 12B avoids the potentially resource-heavy process of application classification under certain circumstances, by implementing the techniques of this disclosure. Additionally, the techniques of this disclosure enable NGFW 12B to conserve network bandwidth by setting up P2P sessions without obtaining peer information from server 18 in scenarios where the P2P request's information matches the cached session data extracted from session information 11A.

An example process of P2P session management in accordance with aspects of this disclosure is described below. First, NGFW 12A receives a packet flow from peer 16A, destined for peer 16B. In turn, NGFW 12A determines, based on the content of one or more packets of the packet flow, an application classification for the packet flow. For instance, NGFW 12B may decapsulate and decrypt data of one or more of the packets (e.g., via deep packet inspection) to determine the application classification information. In this example, NGFW 12A then sends data representing the application classification information (e.g., a 6-tuple of a destination IP address, a destination port, an application protocol, an application name, and an application classification path) to 12B. Additionally, NGFW 12A may also determine whether any packets of the packet flow are malicious, based on the application classification. For instance, NGFW 12A may select signatures for detecting malicious application activity based on the application classification.

If the packets are determined to not be malicious, NGFW 12A then forwards packets of the packet flow to NGFW 12B. In this example, NGFW 12B which represents a "next hop" along the packet flow's route to peer 16B. In turn, NGFW 12B forwards the packets of the packet flow to peer 16B via customer edge 14B and site 15B.

Figure 1B:
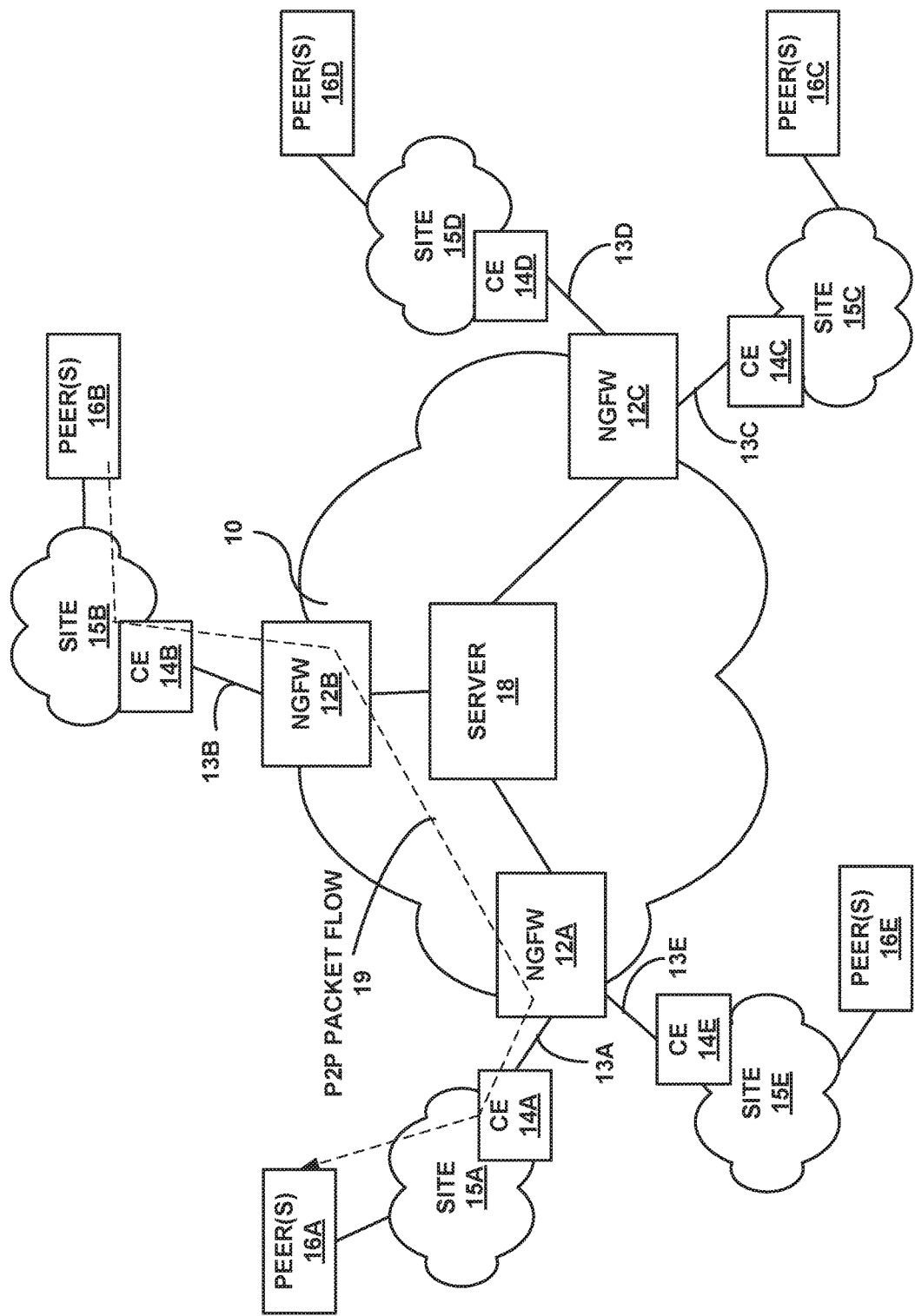
FIG. 1B is a block diagram illustrating a network after a P2P session has been established between peer devices of the network.

In accordance with the P2P session, NGFW 12B may receive a return packet flow from peer 16B destined for peer 16A. The return packet flow may represent a response from peer 16B, as part of the same P2P session. Implementing one or more techniques of this disclosure, NGFW 12B may use the application classification information to determine whether packets of the return packet flow from 16B to 16A are malicious. If the packets of the return packet flow are determined to not be malicious, NGFW 12B may forward the packets of the return packet flow to peer 16A via NGFW 12A FIG. 1B is a block diagram illustrating network 10 after a P2P session has been established between peers 16A and 16B. In some examples, NGFW 12B may receive a request from peer 16B to establish a P2P session (e.g., a BitTorrent® session) with peer 16A. As described above, NGFW 12B may compare information included in the P2P packet flow to session data extracted from session information 11A illustrated in FIG. 1A. If the peer information tuple matches the peer information tuple of the session data extracted from session information 11A, then NGFW 12B may initialize state information for monitoring the P2P session without performing application classification, and without requesting peer information from server 18. Instead, NGFW 12B may assign the application classification for the P2P session by copying the application classification information from the extracted session data.

On the other hand, if the P2P request does not match session data extracted from session information 11A or other shared/cached session data for sessions for which application classification has already been performed, then NGFW 12B may initialize state information and perform application classification for the P2P session from the beginning. For instance, NGFW 12B may perform application classification by decapsulating data from the received P2P request, decrypting the data to identify the application, and storing the application classification information (e.g., to a dedicated card of NGFW 12B). Additionally, NGFW 20 may forward portions of the decapsulated request data to server 18. In turn, server 18 may use the received information to determine which peer device(s) of peers 16 is capable of fulfilling the needs specified in the P2P session request. For instance, server 18 may iterate through a log, or may ping each of peers 16 (other than peer 16B) to determine which of peers 16 has sharable data requested by peer 16B. In the example of FIG. 1B, server 18 may identify peer 16A as the peer with which to pair peer 16B for a requested P2P session. In the example of the P2P request identifying a BitTorrent® session, server 18 may determine that peer 16A has the requested content available for sharing, and that peer 16A meets other requirements (e.g., connection speed, etc.) to fulfill the request.

Regardless of whether the P2P session is set up based on matching the request information with shared and cached session data or set up newly based on a failure to match the request data with any cached session data, NGFWs 12A and 12B may service packet flow 19 between from peer 16A to peer 16B. Via packet flow 19, peer 16A and 16B may participate in the P2P session. In the example described above, peer 16A may fill a data sharing request from peer 16B over a BitTorrent® session.

Figure 1C:
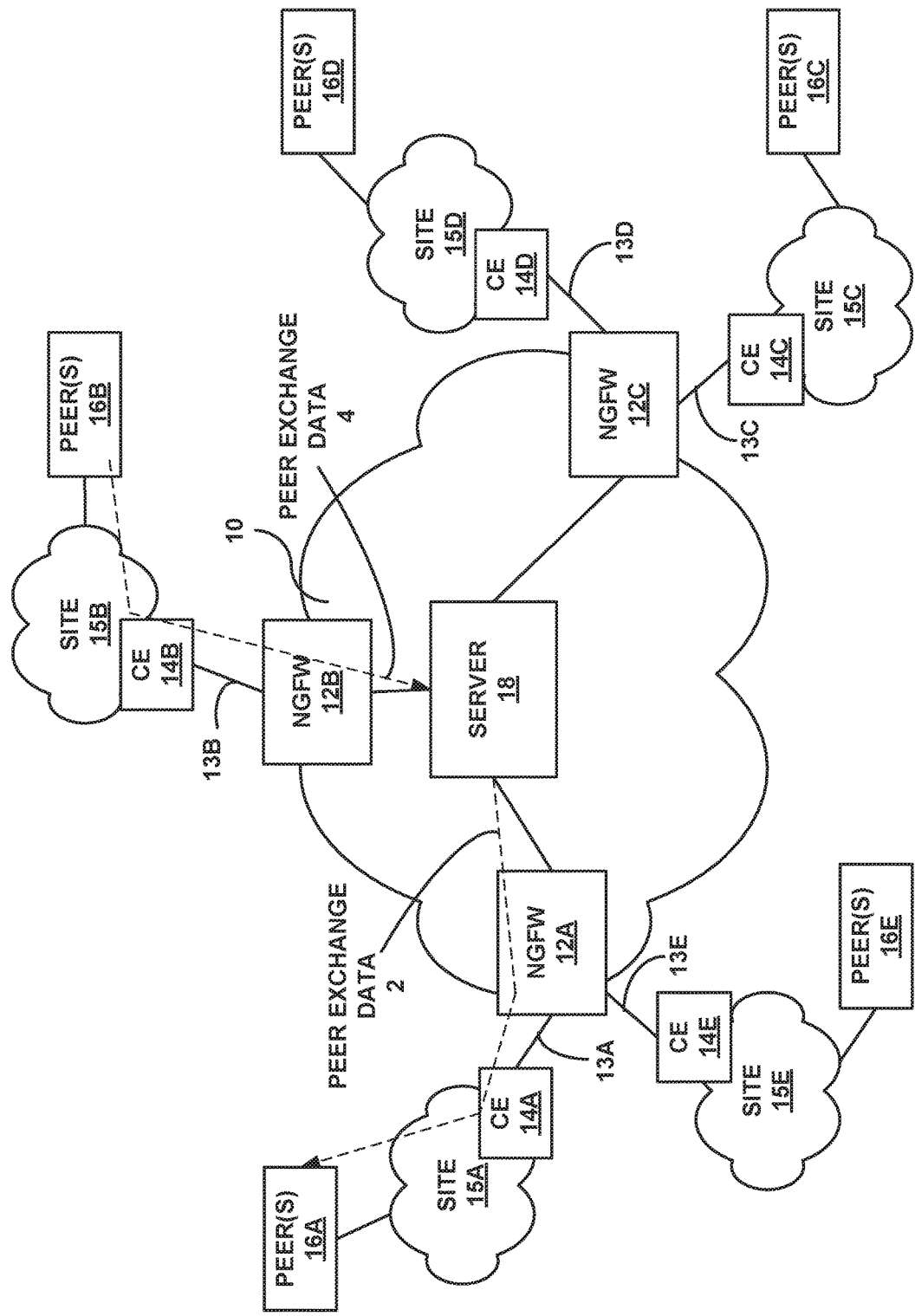
FIG. 1C is a block diagram illustrating federated policy enforcement that next generation firewalls (NGFWs) may implement in accordance with one or more aspects of this disclosure.

FIG. 1C is a block diagram illustrating federated policy enforcement that NGFWs 12 may implement in accordance with one or more aspects of this disclosure. FIG. 1C illustrates peer exchange data 2 that server 18 may provide to peer device 16A, and P2P request 4 that peer device 16B may send to server 18. For instance, peer device 16A may send a P2P request to server 18, to request digital content via a P2P session with another one of peer devices 16. In response, server 18 may provide peer exchange data 2A to peer device, to indicate the IP addresses and port information for other peer devices 16 that can fulfill the P2P request. NGFW 12A may passively monitor, or "snoop" on the contents of peer exchange data 2, to pre-determine a peer information that matches application classification data that NGFW 12A may determine with respect to the resulting P2P session. For instance, if peer exchange data indicates a destination IP address corresponding to peer device 16B, then NGFW 12A may group the IP address of peer device 16B and the port number identified in peer exchange data 2 associated with the resulting packet flow with the application classification information that NGFW 12A determines with respect to the resulting P2P session. In turn, NGFW 12A may distribute the peer information tuple and the application classification information (e.g., a 6-tuple of a destination IP address, a destination port, an application protocol, an application name, and an application classification path) to the remaining NGFWs 12.

In turn, the remaining NGFWs 12 may enforce network-wide policies in a federated manner with respect to future packet flows that have matching peer information. For instance, an administrator of network 10 may set certain policies with respect to the P2P application managed by server 18. If NGFW 12B, for example, receives P2P request 4 from peer device 16B, then NGFW 12B may identify P2P request 4 as being associated with the P2P session to which peer exchange data 2 applies. More specifically, based on the IP address of peer device 16B and a port number matching corresponding portions of peer exchange data 2, NGFW 12B may determine that P2P request 4 is associated with the P2P session that results from peer exchange data 2. In turn, NGFW 12B may automatically apply policies that apply to the classified or identified application to the P2P session that results from P2P request 4.

For instance, the administrator of network 10 may set a rule that NGFWs 12 are to block, drop, or deny all P2P traffic. In this example, NGFW 12B may recognize that P2P request 4 is associated with a P2P application, based on data disseminated by NGFW 12A from snooping on peer exchange data 2. More specifically, by snooping on peer exchange data 2, NGFW 12A may determine that the IP address of server 18 and a particular port number of server 18 are associated with a P2P application. NGFW 12A may distribute the P2P application identification, along with the IP address and port number, to the remaining NGFWs 12. In turn, NGFW 12B may enforce the "block" policy of network 10 by dropping P2P request 4, in response to determining that the destination IP address matches that of server 18, and that the destination port number matches the P2P service provided by server 18.

In this manner, NGFWs 12 may implement the techniques of this disclosure to share and leverage application classification information in such a way that network-wide policy enforcement is performed more efficiently. For instance, each of NGFWs 12 may draw upon shared application classification information to determine a network-wide policy information that applies to a requested session or specific packet flow. In turn, each of NGFWs 12 may enforce the network policy with respect to the requested session or packet flow without performing potentially CPU-heavy application classification from the beginning.

Figure 2:
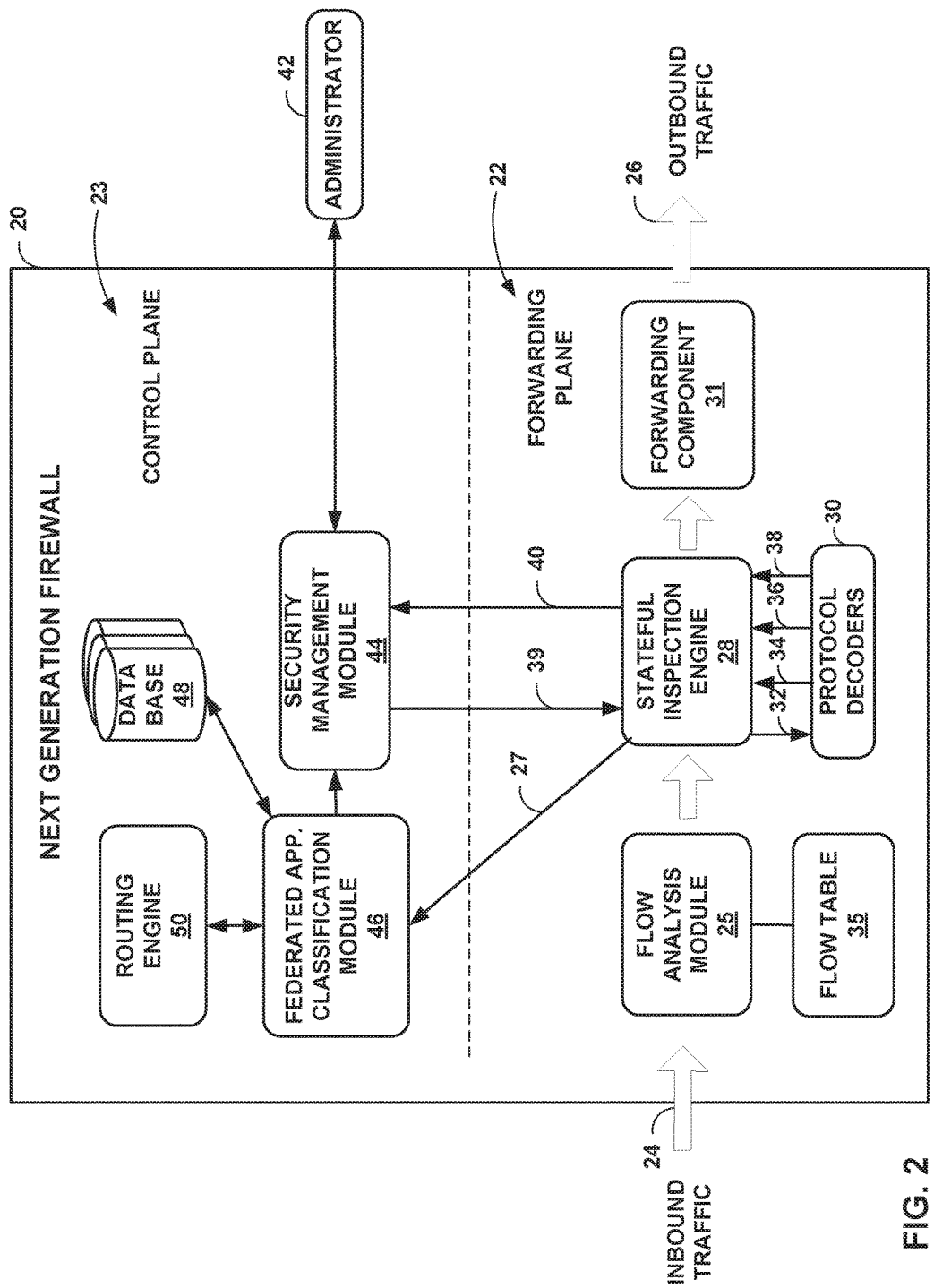
FIG. 2 is a block diagram illustrating an example of a NGFW, in accordance with one or more aspects of this disclosure.

FIG. 2 is a block diagram illustrating an example of a NGFW 20. NGFW 20 is an example implementation of any of NGFWs 12 illustrated in FIG. 1. In the illustrated example, NGFW 20 includes a forwarding plane 22 that transparently monitors inbound network traffic 24 and forwards the network traffic as outbound network traffic 26. In the example illustrated by FIG. 2, forwarding plane 22 includes flow analysis module 25, stateful inspection engine 28, a plurality of protocol decoders 30, and forwarding component 31. NGFW 20 also includes federated application classification module 46 and security management module 44. The example implementation of NGFW 20 of FIG. 2 illustrates NGFW 20 as a single network device, such as one of NGFWs 12 illustrated in FIG. 1. However, it will be appreciated that various functionalities described herein may also be distributed across multiple devices, in various implementations. Additionally, while aspects of FIG. 2 are described with respect to P2P communications for purposes of example, it will be appreciated that NGFW 20 and components thereof may implement the techniques of this disclosure to process communication sessions of various other types, as well.

The implementation of NGFW 20 of FIG. 2 also includes control plane 23. Control plane 23 includes security management module 44, federated application classification module 46, database 48, and routing engine 50. Security management module 44 presents a user interface by which administrator 42 configures NGFW 20. For example, administrator 42 may configure NGFW 20 to monitor particular subnets of the enterprise network. In addition, security management module 44 presents a user interface by which administrator 42 may specify one or more network policies 39, which security management module 44 relays to stateful inspection engine 28. Moreover, security management module 44 may present a user interface by which administrator 42 may modify assumptions regarding packet flow characteristics, such as the highest priority packet flows for monitoring, port bindings for applications, or other features of determining a type of application and protocol associated with the packet flow. Security management module 44 may also present a user interface by which administrator 42 may create, load, update, modify, retrieve, or store an application tree, such as application tree 70 of FIG. 4.

Flow analysis module 25 receives inbound traffic 24 and identifies packet flows within the traffic. Each packet flow represents a flow of packets in one direction within the network traffic and is identified by at least a source address, a destination address and a communication protocol. Flow analysis module 25 may utilize additional information to specify packet flows, including source media access control (MAC) address, destination MAC address, source port, and destination port. Other examples may use other information to identify packet flows, such as IP addresses and/or protocols.

Flow analysis module 25 maintains data within flow table 35 that describes each active packet flow present within the network traffic. Flow table 35 specifies network elements associated with each active packet flow, i.e., low-level information such as source and destination devices and ports associated with the packet flow. In addition, flow table 35 may identify pairs of packet flows that collectively form a single communication session between a client and server. For example, flow table 35 may designate communication session as pairs of packet flows in opposite directions for flows sharing at least some common network addresses, ports, and protocol.

Stateful inspection engine 28 may inspect packet flows to determine the identity of an application associated with the packet flow. Stateful inspection engine 28 may further determine whether a single application is associated with the packet flow, or whether an application is using another application as a transport. Specifically, stateful inspection engine 28 analyzes the packet flow in an attempt to identify each application in an application stack at L7 that originally produced the packet flow. NGFW 20 may use a minimum data size of the reassembled TCP segments, in addition to the signature, in order to identify the types of applications. Certain applications may require a minimum amount of data, so NGFW 20 may distinguish malicious packet flows by determining whether the packet flow contains enough data for the identified protocol. Moreover, NGFW 20 may not necessarily recognize every application.

According to existing network management techniques, a significant portion of the available network bandwidth is consumed by P2P applications such as BitTorrent®, eDonkey, Ares, Mute, Skype®, Gnuetella, Directconnect, and QVOD that are used for content delivery, downloading and sharing of files such as video files, audio files, etc. Additionally, the application classification process for such P2P applications may consume significant amounts of CPU cycles at the provider edge device. Federated application classification module 46 and routing engine 50 may implement the techniques of this disclosure to conserve CPU cycles, thereby improving performance while maintaining accuracy of application classification. For example, federated application classification module 46 and routing engine 50 may cut down on the number of instances in which stateful inspection engine 28 is invoked to perform application classification for P2P packet flows. Additionally, federated application classification module 46 and routing engine 50 may boost network performance by implementing one or more of the techniques disclosed herein.

The genre of P2P applications that facilitate file sharing impact and take a toll on network performance. Consequently, administrators of organizations may wish to maintain control over the organization's network, while not compromising network performance. In many cases, network administrators set rules for P2P applications to be blocked, denied, or rate-limited, such that network performance and bandwidth remain under control. In some network deployments, a large number of devices are deployed, and each device performs similar functions. Examples of such functions include application classification, extraction and storing of information required for state data initialization (e.g., peer information) for a communication session. The devices then enforce policies based on the application classification, and implement policy-driven actions for the session.

According to the techniques of this disclosure, the NGFWs in the network (e.g. NGFWs 12) are configured as coordinated devices, such that NGFWs 12 can send or receive the above information to each other through network using IPFIX or a similar protocol. Federated application classification module 46 is configured to implement one or more techniques of this disclosure to leverage application classification information and peer information received from other NGFW devices positioned at the provider edge of network 10 to obtain application information while mitigating resource consumption to achieve the same results. For instance, federated application classification module 46 may receive the application classification (e.g., a 6-tuple of a destination IP address, a destination port, an application protocol, an application name, and an application classification path) information and a corresponding peer information tuple consisting of a peer IP address and peer in IPFIX format. In some examples, the peer information tuple consists of the peer IP address(es) and the peer port(s) for the P2P session. Federated application classification module 46 implements techniques of this disclosure to extract the peer information tuple and the application classification information from the received data, such as from session information 11 illustrated in FIG. 1A. In turn, federated application classification module 46 is configured to cache the extracted peer information tuple and the application classification information locally at NGFW 20. For instance, federated application classification module 46 may store the extracted peer information tuple and the application classification to database 48 of NGFW 20. By storing the extracted peer information and application classification information (collectively, "session data") to database 48, federated application classification module 46 enables NGFW 20 to re-use the cached session data to update state information for an ongoing P2P session between the same two peers. Likewise, federated application classification module 46 may determine whether an application for a corresponding packet flow was previously identified by a different NGFW. In this manner, federated application classification module implements one or more aspects of this disclosure to conserve computing resources and network bandwidth while maintaining the accuracy of the state information initialized for P2P sessions.

In turn, NGFW 20 may implement techniques of this disclosure to relay the cached session data to other NGFW devices in the same network (e.g., network 10 of FIG. 1). For instance, routing engine 50 of NGFW 20 may obtain the cached session data from database 48. According to this example, a daemon executing on routing engine 50 converts the peer information tuple and the application classification information 6-tuple of the obtained session data into the IPFIX format. In turn, federated application classification module 46 may export the IPFIX-formatted session data to other NGFWs in the network, which are not directly connected to the NGFW that provided the session data to NGFW 20. In some instances, the originating NGFW may disseminate the IPFIX-formatted session data to all NGFWs in the network, which NGFW 20 may incidentally forward to one or more NGFWs. The other NGFWs may then extract the session data from the IPFIX-formatted information received from NGFW 20, and use the session data to initialize state information for future P2P sessions that have matching session data. In this manner, federated application classification module 46 implements one or more techniques of this disclosure to enable other NGFWs in the network to leverage pre-processed session information in initializing state information for monitoring of future P2P sessions. For instance, federated application classification module 46 facilitates the sharing of pre-processed session data between NGFWs that are not directly connected with one another.

In instances where NGFW 20 performs application classification and initializes the state information for monitoring of a P2P session, federated application classification module 46 implements techniques of this disclosure to cache and export the generated application classification information (e.g., the 6-tuple of a destination IP address, a destination port, an application protocol, an application name, and an application classification path) to the other NGFWs in network 10. In some scenarios, a P2P packet flow may be "new" to federated application classification module 46, in that federated application classification module 46 may not have access to previously-processed session information that matches the peer information tuple for the P2P packet flow received from a downstream device. As one example, database 48 may not have any session information cached at the time of receiving the P2P packet flow. As another example, database 48 may include some pre-processed session data extracted from session information shared by another NGFW, such as session information 11A illustrated in FIG. 1. However, in this example, the peer information tuple applicable to the P2P packet flow may not match the corresponding tuple of any session data previously cached in database 48.

In these scenarios, stateful inspection engine 28 of NGFW 20 performs application classification with respect to the received P2P session request. More specifically, stateful inspection engine 28 decapsulates and decrypts the payload of the session request to determine application classification 27. Stateful inspection engine 28 may also communicate application classification 27 to federated application classification module 46. In various examples, stateful inspection engine 28 may export application classification to federated application classification module, or may make application classification 27 available for as-needed retrieval by federated application classification module 46. NGFW 20 also initializes the state information for monitoring the P2P session in these scenarios. As described, NGFW 20 forwards portions of the request to a P2P server, and receives a server response identifying the peer device(s) what can fulfill the P2P session request. In turn, NGFW 20 initializes the state information for the P2P session using the peer information received from the server. Federated application classification module 46 and routing engine 50 may implement various techniques of this disclosure to enable reuse of the application classification information and peer information (collectively, "session data") in initializing state information for the monitoring of future P2P sessions. For instance, federated application classification module 46 may cache the generated session data by storing the session data to database 48. In turn, routing engine 50 may package the peer information tuple and the application information in the IPFIX format, which can be interpreted by other NGFWs positioned at the provider edge of the network. Federated application classification module 46 may obtain the IPFIX-formatted session data, and export the session data to other NGFWs positioned at the provider edge of the network. It will be appreciated that routing engine 50 may implement the techniques of this disclosure to extract and format cached application classification information and cached peer information at different times, or concurrently. Similarly, federated application classification module may export the IPFIX-formatted application classification information 6-tuple and the IPFIX-formatted peer information tuple at different times, or concurrently. Additionally, while described herein with respect to P2P sessions for purposes of illustration, it will be appreciated that the techniques of this disclosure may enable NGFW 20 to cache and/or export network session data that is used for sessions other than P2P sessions.

Thus, federated application classification module 46 and routing engine 50 of NGFW 20 implement the techniques of this disclosure to share application classification data that is generated by stateful inspection engine 28 with other NGFWs in the same network. By sharing the application classification data generated by stateful inspection engine 28, federated application classification module 46 and routing engine 50 enable other NGFWs in the network to identify an application without expending the computing resources that would otherwise be required to perform application classification from the beginning. Instead, the receiving NGFW(s) may simply correlate the peer information tuple of future packet flows, return packet flows, or P2P session requests to the session data provided by federated application classification module 46, and infer the application classification information therefrom. Additionally, by sharing the peer information tuple for a P2P session, federated application classification module 46 and routing engine 50 implement the techniques of this disclosure to enable other NGFWs in the network to initialize state information for monitoring future P2P sessions between the same peers, without expending the computing resources and consuming the network bandwidth that would otherwise be required. In this manner, federated application classification module 46 and routing engine 50 may implement the techniques of this disclosure to improve device-level performance metrics and network performance, while maintaining robustness in monitoring communication sessions between peer devices. In other words, federated application classification module 46 and routing engine 50 enable one or more other NGFWs in the network to service two peer groups (where each peer is positioned upstream of multiple end-user devices) that participate in a communication session.

In some examples, NGFW 20 implements aspects of this disclosure to leverage rules and action information from other NGFWs in the same network. For instance, NGFW 20 may perform policy enforcement by drawing on rules obtained from the other NGFWs, without reaching the stage of application classification for a traffic flow. In one example, NGFW 20 is part of an academic network, such as a university network. The university may enforce a rule that mandates the dropping of all P2P traffic. NGFW 20 may implement the techniques of this disclosure to obtain the "no P2P" rule from the other NGFWs in the network, and may automatically drop all P2P traffic. In this instance, NGFW 20 obtains the rule from the other NGFWs, and implements network-wide policy enforcement without performing potentially CPU-intensive application classification for the traffic flow. For instance, NGFW 20 may drop any received IPFIX message for a P2P flow without extracting the encapsulated session information. NGFW 20 may also implement the leveraged policy enforcement techniques of this disclosure to implement "block" or "deny" rules with respect to shared session information for communication sessions.

Figure 3:
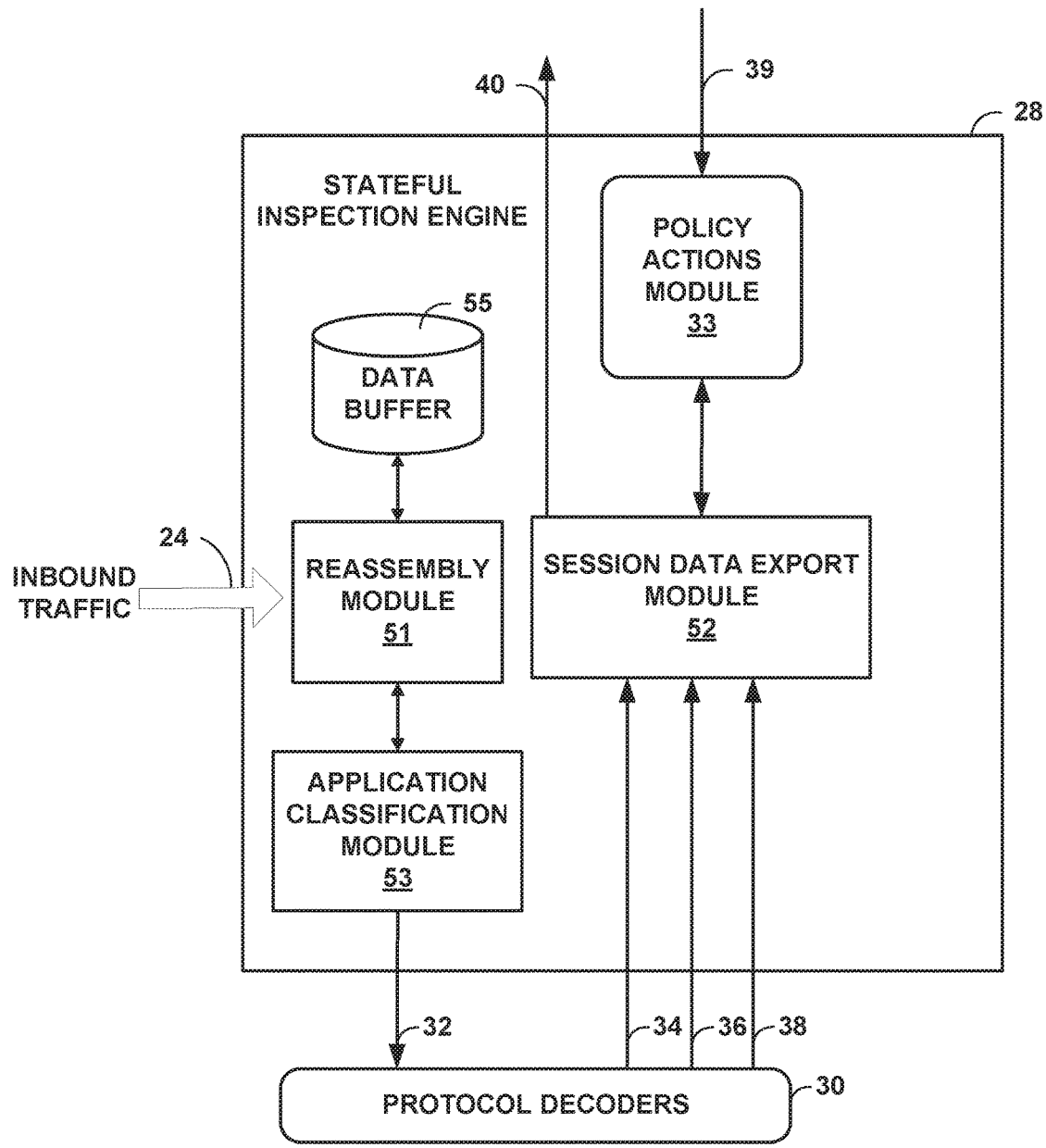
FIG. 3 is a block diagram that illustrates an example implementation of a stateful inspection engine, in accordance with one or more aspects of this disclosure.

FIG. 3 is a block diagram that illustrates an example implementation of stateful inspection engine 28. In the example implementation illustrated in FIG. 3, stateful inspection engine 28 includes reassembly module 51, application classification module 53, and session data export module 52. In addition, stateful inspection engine 28 includes data buffer 55, and policy actions module 33. Although stateful inspection engine 28 and components thereof may implement the techniques of this disclosure to process communication sessions of various types, aspects of FIG. 3 are described below with respect to P2P sessions, as a non-limiting example.

Reassembly module 51 receives inbound network traffic 24 and reassembles application-layer communications 32 from the packet flows. Reassembly module 51 forwards the reassembled application-layer communications 32 to the appropriate protocol decoders 30 for processing.

Application classification module 53 identifies the type of application and underlying protocol for each intercepted communication session. When stateful inspection engine 28 receives a packet as part of a packet flow, reassembly module 51 buffers the packet in data buffer 55. In one example, data buffer 55 may store data as a sliding window. That is, data buffer 55 may store data until becoming full or reaching a specified required amount of minimum data for identification. When full, data buffer 55 discards certain data to make room for storing new data. In one example, data buffer 55 may store and discard data according to a first-in, first-out ("FIFO")-like protocol wherein the first data to be stored is the first data to be discarded when data buffer 55 becomes full. In another example, data buffer 55 may discard data according to a least recently used protocol wherein, when data buffer 55 is full, the packet flow which has been least recently used will be discarded to make room for new data to be stored.

In one example, reassembly module 51 may associate packets in a packet flow, and packet flows as a communication session, according to the 5-tuple {source IP address, destination IP address, protocol, source port, destination port}. Other example implementations may use other forms of associating packets. For example, in one implementation, NGFW 20 may be part of a network that utilizes virtual local area networks (VLANs). Accordingly, reassembly module 51 may associate packets in a packet flow according to a VLAN identifier, a source address, and a destination address. In any case, reassembly module 51 may utilize the information maintained within flow table 35 (FIG. 2) to reassemble network data, e.g., to form reassembled TCP data.

Application classification module 53 analyzes the reassembled data for the packet flow to identify the type of application and protocol associated with the packet flow. If application classification module 53 is unable to classify or identify the type of application and protocol associated with the packet flow, application classification module 53 may use the well-known static port binding as a default application selection. Table 1, below, shows an example static port binding list. Other implementations may use more, fewer, or different entries in a static port table. Moreover, administrator 42 may configure the static port mapping using security management module 44. While Table 1 illustrates non-limiting examples of applications that application classification module 53 may process, it will be appreciated that application classification module 53 may also process other applications using the techniques described herein.

TABLE I

| PORT | APPLICATION |
| --- | --- |
| 20 | FTP |
| 22 | SSH |
| 23 | Telnet |
| 25 | SMTP |
| 43 | WHOIS |
| 53 | DNS |
| 67 | BOOTP or DHCP |
| 70 | Gopher |
| 79 | Finger |
| 80 | HTTP |
| 109 | POP |
| 110 | POP3 |
| 113 | ident/IRC |
| 118 | SQL |
| 119 | NNTP |
| 194 | IRC |
| 443 | HTTPS |
| 445 | SMB |
| 564 | RTSP |

In the case where application classification module 53 is unable to classify or identify a type of application and protocol for a packet flow, application classification module 53 may use the default static port mapping to determine an application, causing NGFW 20 to respond accordingly. In some cases, application classification module 53 may not be able to classify or identify the application and the static port mapping may not have an entry for the requested port number. Various implementations may treat this situation according to specifications of, for example, a system administrator. For example, in one implementation, NGFW 20 simply forwards packet flows with undetermined application types and protocols that cannot be determined by the static port mapping pass, as an unknown application may indicate that the packet flow is not targeting any type of application known to pose a security threat. In other examples, NGFW 20 may automatically discard packet flows with unknown application types and protocols that cannot be determined by the static port mapping.

Application classification module 53 may include a hierarchically ordered list of similar application types. Application classification module 53 may store this list as a tree structure in a computer-readable medium. Security management module 44 may provide administrator 42 with a user interface to modify the contents and hierarchy of the list. Upon receiving a packet flow which may belong to one of several similar applications, application classification module 53 may implement a preliminary "best guess" of the application and associated protocol by selecting the type of application designated as the highest ordered application in the list to which the packet flow corresponds. As application classification module 53 receives more information about the packet flow, application classification module 53 may alter the original determination accordingly. After determining an application, application classification module 53 may cache the determination for subsequent comparison.

Session data export module 52 may be configured, in accordance with aspects of this disclosure, to enable federated application classification module 46 to share session data with other NGFW devices in the same network. For instance, Session data export module 52 may implement one or more techniques of this disclosure to combine an application classification 6-tuple with a peer information tuple for sharing with other NGFW devices in the network.

In instances where application classification module 53 determines that a packet is associated with a new session, application classification module 53 may perform deep packet inspection to determine application classification information for the packet flow. For instance, application classification module 53 may decapsulate, decrypt, and inspect the contents of one or more data packets of the packet flow to determine the application classification. In accordance with one or more aspects of this disclosure, application classification module 53 makes the application classification information available to federated application classification module 46. In one example, application classification module 53 exports the application classification information available to federated application classification module 46. In another example, application classification module 53 grants access to the application classification information to federated application classification module 46, thereby enabling federated application classification module 46 to actively obtain the information on an as-needed basis. In the scenario where application classification was already determined for a packet flow, reassembly module 51 may provide the application data 32 directly to protocol decoders 30, without invoking application classification module 53 to determine an application classification, as the application classification information is already available.

Policy actions module 33 may be configured, according to one or more aspects of this disclosure, to enforce network-wide policy constraints in a federated manner, based on shared session data. For instance, policy actions module 33 may receive one or more network policies 39 from security management module 44 (FIG. 2). In turn, policy actions module 33 may automatically apply pre-determined network policies 39 to a session request or a packet flow, based on application classification information pertaining to the request.

In the event a security risk is detected, stateful inspection engine 28 outputs alert 40 to security management module 44 (FIG. 2) for logging and further analysis. Stateful inspection engine 28 may also direct forwarding component 31 to automatically drop the packet flow associated with the application-layer communications within which the network attack was detected. In this manner, stateful inspection engine 28 combines pattern matching with protocol-specific anomaly analysis to detect sophisticated attack behaviors.

Figure 4:
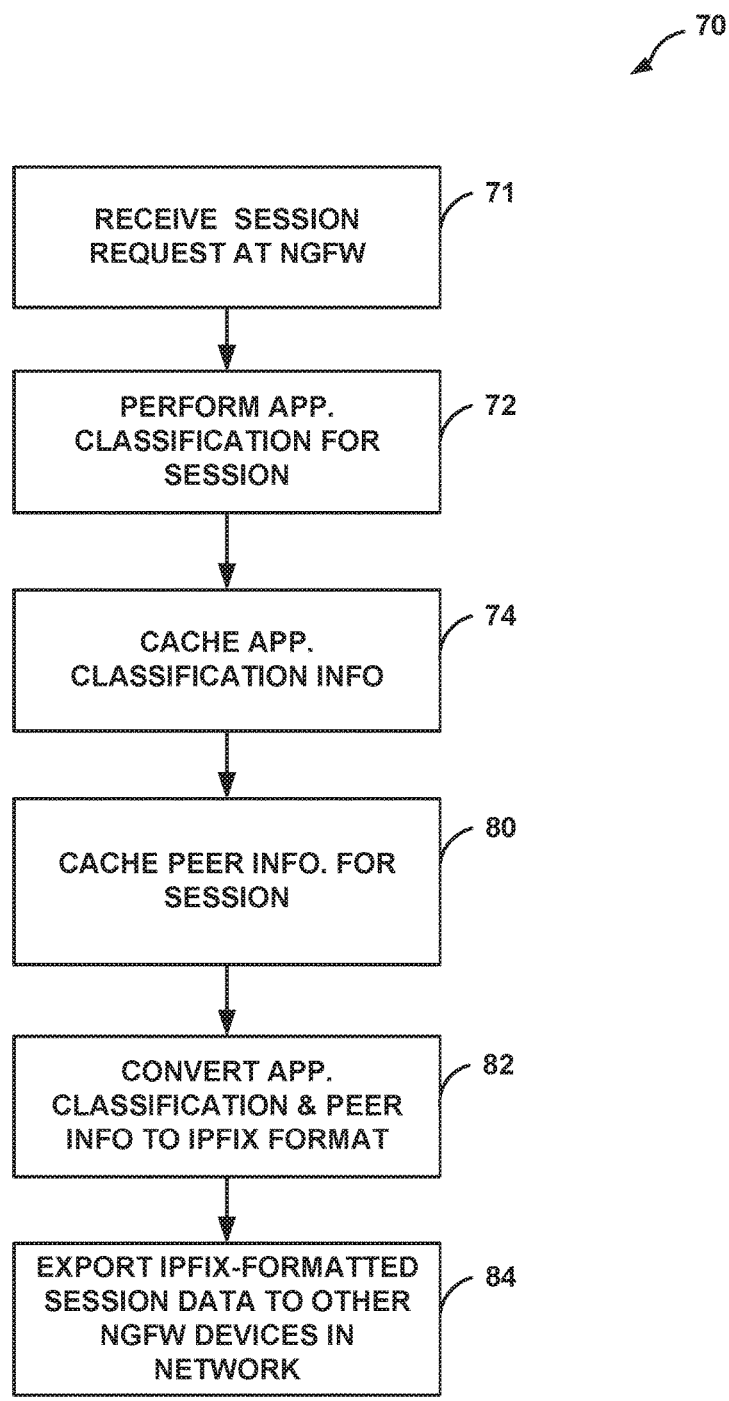
FIG. 4 is a flowchart illustrating an example process by which a device may perform application classification and state data initialization and export portions of the resulting session data to another device, according one or more techniques of this disclosure.

FIG. 4 is a flowchart illustrating an example process 70 by which a device may perform application classification and state data initialization and export portions of the resulting session data to another device, according one or more techniques of this disclosure. Although process 70 may be performed by a variety of devices, such as devices positioned at a provider edge of a network, process 70 is described herein as being performed by NGFW 20 (and/or components thereof) as illustrated in FIG. 2. Process 70 may begin when NGFW 20 receives a communication session request from a downstream peer device (71). Although NGFW 20 may service communication sessions of various types according to the techniques of this disclosure, process 70 is described herein with respect to P2P sessions as a non-limiting example. In turn, stateful inspection engine 28 may perform application classification with respect to the received session request (72). For instance, stateful inspection engine 28 may decapsulate and decrypt data of a P2P session request to determine application classification information for any packet flows of the resulting session. Additionally, stateful inspection engine 28 may iterate through service cards of NGFW 20 to determine whether any of the service cards includes application classification information that matches the application type of the received P2P session request. If stateful inspection engine determines that none of the service cards includes application information matching that of the P2P session request, then stateful inspection engine 28 may populate a service card with the application identification information of the P2P request. In a non-limiting example described in further detail below, the received P2P request is for a BitTorrent® data-sharing session.

After stateful inspection engine 28 performs application classification with respect to the received P2P session request, federated application classification module 46 may cache the application classification information locally at NGFW 20 (74). For instance, federated application classification module 46 may cache a 6-tuple of a destination IP address, a destination port, an application protocol, an application name, and an application classification path pertaining to the requested session (in this case, a requested P2P session). Additionally, federated application classification module 46 may cache the peer information for the requested P2P session locally at NGFW 20 (80). For instance, in the example where the received P2P session request is associated with a BitTorrent® session, federated application classification module 46 may associate BitTorrent® identification information with the peer information of the session request to form session data, and store the session data to database 48. At the establishment time of the BitTorrent® session, NGFW 20 may facilitate peer exchange between the client device(s) and the BitTorrent® tracker server (e.g., server 18 of FIG. 1). The BitTorrent® tracker server may send the peer list to the client (one of peers 16) at the time of peer exchange. NGFW 20 may extract and store the session attributes, such as peer IP, peer port information, and protocol information (collectively, the "peer information tuple").

Routing engine 50 of NGFW 20 may obtain the session data from database 48 and covert the session data into the IPFIX format (82). While described herein with respect to the IPFIX format as a non-limiting example, it will be appreciated that routing engine 50 may implement the techniques of this disclosure to convert the cached session data to any other format that can be readily processed by other provider edge devices (e.g., NGFWs) in the network. In turn, federated application classification module 46 may export the IPFIX-formatted session data to the other NGFWs in the network (84). For instance, federated application classification module 46 may be configured with the set of IP addresses of other NGFWs that can process and syncing the exported IPFIX-formatted session data.

Figure 5:
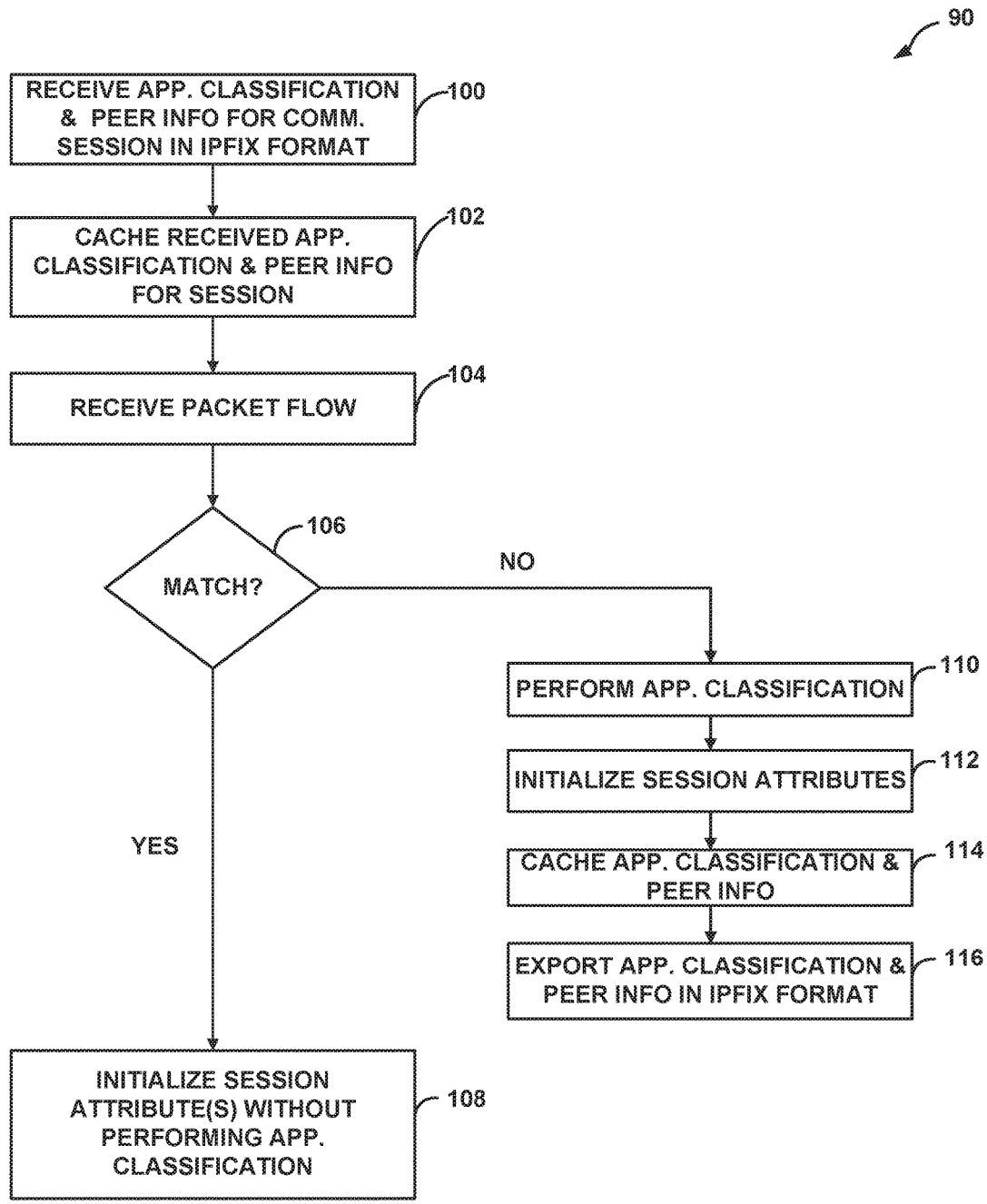
FIG. 5 is a flowchart illustrating an example process by which a device may perform application classification and state data initialization while leveraging session data shared by another device, according one or more techniques of this disclosure.

FIG. 5 is a flowchart illustrating an example process 90 by which a device (e.g., NGFW 20 of FIG. 2) may perform application classification and state data initialization while leveraging session data shared by another device, according one or more techniques of this disclosure. Process 90 may begin when NGFW 20 receives session data (namely, a combination of an application classification information 6-tuple and a corresponding peer information tuple for a communication session) in IPFIX format from another NGFW positioned at the provider edge of the same network (100). A daemon, or "IPFIX listener" executing via routing engine 50 is configured to monitor or "listen" for IPFIX messages that carry session data shared in IPFIX format. To detect an IPFIX-formatted message that shares session data, the IPFIX listener executing at routing engine 50 may determine whether a message type ("msg-type") associated with the message corresponds to application classification information.

Upon routing engine 50 detecting an IPFIX-formatted message that includes shared session data, federated application classification module 46 may extract the application classification information 6-tuple and peer information tuple, and cache the extracted session data by storing it to database 48 (102). Additionally, routing engine 50 may relay the application classification information extracted from the session data to a service card or "service pic" of NGFW 20. By forwarding the application classification information to the service pic, routing engine 50 may sync the application classification information with data generated or used by components of forwarding engine 22, such as stateful inspection engine 28.

In turn, NGFW 20 may receive a new packet flow of an existing communication session from a downstream device, such as a peer device (104). Federated application classification module 46 may perform a system cache lookup in database 48 to determine whether a peer information tuple matching the corresponding parameters of the session request (e.g., a P2P request) have already been cached via sharing from other NGFWs. Additionally, security management module 44 may enforce any cached firewall policies that are applicable to the identified application (BitTorrent® in one example).

Federated application classification module 46 may determine whether or not the peer information tuple provided in the session request matches any shared session data that was previously extracted and stored to database 48 (decision block 106). If federated application classification module 46 determines that database 48 contains session data that matches the peer information tuple of the session request ('YES' branch of 106), then federated application may initialize the session attributes of the communication session using the cached application classification information (108). In this example, processing of the session (e.g., P2P session) is not subjected to re-classification at NGFW 20, based on the matching of peer information fields between the P2P session request and the session data already cached at database 48. Instead, federated application classification module 46 may reuse application classification stored in database 48 that corresponds to the matching peer information tuple. In this manner, NGFW 20 implements the techniques of this disclosure to conserve computing resources by avoiding application classification in some scenarios, as application classification is often a CPU-heavy process.

However, if federated application classification module 46 determines that the session data of the session request do not match any cached session data ('NO' branch of 106), then federated application classification module 46 may cause stateful inspection engine 28 to perform application classification with respect to the new packet flow (110). For instance, stateful inspection engine 28 may decapsulate and decrypt data of the new packet flow. Additionally, stateful inspection engine 28 may survey the service cards of NGFW 20 to determine an appropriate application classification, or may populate a service card with the application classification if none of the service cards includes a match. In turn, stateful inspection engine 28 may initialize the session attributes for the requested session using the generated application classification information and the peer information obtained from the tracker server during peer exchange (112).

Federated application classification module 46 may cache the application classification information and the peer information tuple pertaining to the packet flow by storing the consolidated session data to database 48 (114). In turn, routing engine 50 and federated application classification module 46 may package the session data for the requested (e.g., P2P) session in IPFIX format, and export the IPFIX-formatted session information to various coordinated devices (e.g., the other NGFWs) of the network. In this way, NGFW 20 implements techniques of this disclosure to enable coordinated devices to leverage pre-processed session attributes, and to avoid application classification in certain scenarios.

In this way, NGFW 20 represents an example of a first security device comprising a memory configured to store network communications data and one or more processors for processing at least a portion of the network communications data. The one or more processors of the first security device may be configured to receive data representative of an application classification for a first packet flow from a second security device, receive data of a second packet flow, and when the second packet flow corresponds to the first packet flow, monitor the data of the second packet flow based on the application classification for the first packet flow without determining an application classification for the second packet flow. In some examples, the one or more processors of the first security device are further configured to, when the second packet flow does not correspond to the first packet flow, determine the application classification for the second packet flow; and monitor the second packet flow based on the application classification determined for the second packet flow. In some examples, to determine the application classification for the second packet flow, the one or more processors of the first security device are configured to decapsulate and decrypt data of at least one data packet of the second packet flow.

In some examples, the one or more processors of the first security device are further configured to compare first peer information associated with the first packet flow against second peer information associated with the second packet flow to determine whether the second packet flow corresponds to the first packet flow. In some examples, each of the first peer information and the second peer information comprises layer three (L3) data, and the application classification for the first packet flow comprises layer seven (L7) data. In some examples, each of the first peer information and the second peer information includes a respective tuple of a peer internet protocol (IP) address and a peer port. In some examples, the one or more processors of the first security device are further configured to determine that the second packet flow corresponds to the first packet flow, when the second peer information matches the first peer information. In some examples, the one or more processors of the first security device are configured to determine that the second packet flow does not correspond to the first packet flow, when the second peer information does not match the first peer information.

According to some examples, the one or more processors of the first security device are further configured to determine the second peer information by snooping on a data packet communicated between a client device positioned downstream of the first security device and a server positioned upstream of the first security device. According to some examples, the one or more processors of the first security device are further configured to determine the second peer information by snooping on a data packet communicated between a first client device positioned downstream of the first security device and a second client device positioned downstream of the second security device. According to some examples, the one or more processors are further configured to cache the data representative of the application classification for the first packet flow, and relay the data representative of the application classification for the first packet flow to a third security device.

In some examples, the one or more processors of the first security device are further configured to, when the second packet flow does not correspond to the first packet flow, determine the application classification for the second packet flow, and send the application classification determined for the second packet flow to a third security device. In some examples, this disclosure is directed to a system that includes a first security device configured to send data representative of an application classification for a first packet flow to one or more security devices that are communicatively coupled to the first security device. The system may further include a second security device of the one or more security devices that are communicatively coupled to the first security device, the second security device being configured to receive the data representative of the application classification for the first packet flow from a first security device, to receive data of a second packet flow, and to monitor the data of the second packet flow based on the application classification for the first packet flow without determining an application classification for the second packet flow, when the second packet flow corresponds to the first packet flow. In some examples, this disclosure is directed to a first security device configured to determine an application classification for a first packet flow, and to communicate the application classification for the first packet flow and peer information for the first packet flow to a second security device that is communicatively coupled to the first security device.

The techniques described in this disclosure may be implemented in hardware or any combination of hardware and software (including firmware). Any features described as units, modules, or components may be implemented together in an integrated logic device or separately as discrete but interoperable logic devices. If implemented in hardware, the techniques may be realized in a processor, a circuit, a collection of logic elements, or any other apparatus that performs the techniques described herein. If implemented in software, the techniques may be realized at least in part by a non-transitory computer-readable storage medium or computer-readable storage device encoded with, having stored thereon, or otherwise comprising instructions that, when executed, cause one or more processors, such as programmable processor(s), to perform one or more of the methods described above. The non-transitory computer-readable medium may form part of a computer program product, which may include packaging materials. The non-transitory computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein, may refer to any of the foregoing structures or any other structure suitable for implementation of the techniques described herein. Likewise, the term "control unit," as used herein, may refer to any of the foregoing structures or any other structure suitable for implementation of the techniques described herein. In addition, in some aspects, the functionality described herein may be provided within dedicated software and hardware units configured to perform the techniques of this disclosure. Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various examples have been described. These and other examples are within the scope of the following claims.

What is claimed is:

1. A method comprising:
receiving, by a first security device, layer 7 (L7) network data representative of application classification information for a first packet flow from a second security device, wherein the L7 network data representative of the application classification information identifies an application that produced the first packet flow;
receiving, by the first security device, data packets of a second packet flow;
determining, by the first security device, that the second packet flow is produced by the application that produced the first packet flow; and
based on the second packet flow being produced by the application that produced the first packet flow, inspecting, by the first security device, the data packets of the second packet flow based on the L7 network data representative of the application classification information for the first packet flow without determining separate application classification information for the second packet flow.

2. The method of claim 1, wherein determining that the second packet flow is produced by the application that produced the first packet flow comprises comparing, by the first security device, first peer information of the first packet flow against second peer information of the second packet flow.

3. The method of claim 2,
wherein each of the first peer information and the second peer information comprises layer three (L3) network data.

4. The method of claim 2, wherein each of the first peer information and the second peer information includes a respective tuple including a peer internet protocol (IP) address and a peer port.

5. The method of claim 2,
wherein determining that the second packet flow is produced by the application that produced the first packet flow comprises determining, by the first security device that the second peer information matches the first peer information, based on the comparison.

6. The method of claim 2, further comprising determining, by the first security device, the second peer information by snooping on packet data communicated between a client device positioned downstream of the first security device and a server positioned upstream of the first security device.

7. The method of claim 2, further comprising determining, by the first security device, the second peer information by snooping on packet data communicated between a first client device positioned downstream of the first security device and a second client device positioned downstream of the second security device.

8. The method of claim 1, further comprising:
caching, by the first security device, the L7 network data representative of the application classification information for the first packet flow; and
relaying, by the first security device, the L7 network data representative of the application classification information for the first packet flow to a third security device.

9. A first security device comprising:
a memory configured to store network communications data; and
one or more processors for processing at least a portion of the network communications data, the one or more processors being configured to:
receive layer 7 (L7) network data representative of application classification information for a first packet flow from a second security device, wherein the L7 network data representative of the application classification information identifies an application that produced the first packet flow;
receive data packets of a second packet flow;
determine that the second packet flow is produced by the application that produced the first packet flow; and
based on the second packet flow being produced by the application that produced the first packet flow, inspect the data packets of the second packet flow based on the L7 network data representative of the application classification information for the first packet flow without determining separate application classification information for the second packet flow.

10. The first security device of claim 9, wherein to determine that the second packet flow is produced by the application that produced the first packet flow, the one or more processors are configured to compare first peer information of the first packet flow against second peer information of the second packet flow.

11. The first security device of claim 10, wherein each of the first peer information and the second peer information comprises layer three (L3) network data.

12. The first security device of claim 10, wherein each of the first peer information and the second peer information includes a respective tuple including a peer internet protocol (IP) address and a peer port.

13. The first security device of claim 10, wherein to determine that the second packet flow is produced by the application that produced the first packet flow, the one or more processors are configured to determine that the second peer information matches the first peer information, based on the comparison.

14. The first security device of claim 10, wherein the one or more processors are further configured to determine the second peer information by snooping on packet data communicated between a client device positioned downstream of the first security device and a server positioned upstream of the first security device.

15. The first security device of claim 10, wherein the one or more processors are further configured to determine the second peer information by snooping on packet data communicated between a first client device positioned downstream of the first security device and a second client device positioned downstream of the second security device.

16. The first security device of claim 9, wherein the one or more processors are further configured to:
cache the L7 network data representative of the application classification information for the first packet flow; and
relay the L7 network data representative of the application classification information for the first packet flow to a third security device.

17. A non-transitory computer-readable storage medium encoded with instructions that, when executed, cause one or more processors of a first security device to:
receive layer 7 (L7) network data representative of application classification information for a first packet flow from a second security device, wherein the L7 network data representative of the application classification information identifies an application that produced the first packet flow;
receive data packets of a second packet flow;
determine that the second packet flow is produced by the application that produced the first packet flow; and
based on the second packet flow being produced by the application that produced the first packet flow, inspect the data packets of the second packet flow based on the L7 network data representative of the application classification information for the first packet flow without determining separate application classification information for the second packet flow.

18. A system comprising:
a first security device configured to:
send layer 7 (L7) network data representative of application classification information for a first packet flow to one or more security devices that are communicatively coupled to the first security device, wherein the L7 network data representative of the application classification information identifies an application that produced the first packet flow; and
a second security device of the one or more security devices that are communicatively coupled to the first security device, the second security device being configured to:
receive the L7 network data representative of the application classification information for the first packet flow from the first security device;
receive data packets of a second packet flow;
determine that the second packet flow is produced by the application that produced the first packet flow; and
based on the second packet flow being produced by the application that produced the first packet flow, inspect the data packets of the second packet flow based on the L7 network data representative of the application classification information for the first packet flow without determining separate application classification information for the second packet flow.

19. A method comprising:
determining, by a first security device, layer 7 (L7) network data representative of application classification information for a first packet flow; and
communicating, by the first security device, the L7 network data representative of the application classification information for the first packet flow and peer information comprising a peer internet protocol (IP) address and a peer port for the first packet flow to a second security device that is communicatively coupled to the first security device.

20. The method of claim 19, wherein the application comprises a peer-to-peer (P2P) application.

21. The method of claim 20, wherein the P2P application comprises one of a BitTorrent® application, an eDonkey application, an Ares application, a Mute application, a Skype® application, a Gnuetella application, a Directconnect application, or a QVOD application.

22. The method of claim 1, wherein the application comprises a peer-to-peer (P2P) application.

23. The method of claim 22, wherein the P2P application comprises one of a BitTorrent® application, an eDonkey application, an Ares application, a Mute application, a Skype® application, a Gnuetella application, a Directconnect application, or a QVOD application.

24. The first security device of claim 9, wherein the application comprises a peer-to-peer (P2P) application.

25. The first security device of claim 22, wherein the P2P application comprises one of a BitTorrent® application, an eDonkey application, an Ares application, a Mute application, a Skype® application, a Gnuetella application, a Directconnect application, or a QVOD application.

* * * * *